(12) United States Patent
Loup et al.

(10) Patent No.: US 7,484,794 B2
(45) Date of Patent: Feb. 3, 2009

(54) JUNCTION DEVICE BETWEEN AN AERATION CONDUIT EQUIPPING THE SQUAB OF A TILTING AND/OR REMOVABLE SEAT, IN PARTICULAR FOR A VEHICLE, AND AN AIR SUPPLY CONDUIT

(75) Inventors: Didier Loup, Maurepas (FR); Carine Paumier, Versailles (FR); Vincent Feuillard, Le Mesnil Saint Denis (FR)

(73) Assignee: Valeo Climatisation S.A., La Verriere (FR)

( * ) Notice: Subject to any disclaimer, the term of this patent is extended or adjusted under 35 U.S.C. 154(b) by 155 days.

(21) Appl. No.: 11/212,260

(22) Filed: Aug. 26, 2005

(65) Prior Publication Data
US 2006/0043732 A1 Mar. 2, 2006

(30) Foreign Application Priority Data
Aug. 27, 2004 (FR) .................................. 04 09176

(51) Int. Cl.
*B60N 2/02* (2006.01)
*A47C 7/72* (2006.01)
(52) U.S. Cl. ................. 296/208; 296/65.05; 296/65.09; 297/180.1
(58) Field of Classification Search ............... 297/180.1, 297/180.13, 180.14; 296/208, 65.05, 65.09, 296/180.1, 180.13, 180.14
See application file for complete search history.

(56) References Cited

U.S. PATENT DOCUMENTS

| 3,140,105 | A | * | 7/1964 | Bielinski ....................... 285/71 |
| 5,002,336 | A | * | 3/1991 | Feher ...................... 297/180.13 |
| 5,016,302 | A | * | 5/1991 | Yu .................................. 5/423 |
| 6,059,018 | A | * | 5/2000 | Yoshinori et al. ............. 165/42 |
| 6,478,369 | B1 | | 11/2002 | Aoki et al. |
| 6,932,409 | B2 | * | 8/2005 | Falchero et al. .......... 296/65.09 |

FOREIGN PATENT DOCUMENTS

| EP | 0 558 408 A | 9/1993 |
| FR | 2 717 426 A | 9/1995 |
| JP | 200052747 | 9/2000 |

\* cited by examiner

*Primary Examiner*—Dennis H Pedder
(74) *Attorney, Agent, or Firm*—Howard & Howard Attorneys, P.C.

(57) ABSTRACT

The object of the invention is a junction device between a conduit mounted on a floor for supplying air, in particular coming from a heating, ventilation and/or air conditioning installation, and an aeration conduit mounted on the squab of a seat, mounted so as to move in rotation about an axis A1 fixed to the floor. The junction device comprises rigid members respectively allocated to the supply conduit and to the aeration conduit. These rigid members are mounted so as to move with respect to each other for putting the conduits in air communication with each other, at least in the folded-down position of use of the seat.

18 Claims, 10 Drawing Sheets fig. 2 fig. 1 fig. 3 fig. 4 fig.5 fig.6 fig.8 fig.9 fig.10 fig.11 fig.12 fig.13 fig.14 fig.15 fig.18 fig.16 fig.17

JUNCTION DEVICE BETWEEN AN AERATION CONDUIT EQUIPPING THE SQUAB OF A TILTING AND/OR REMOVABLE SEAT, IN PARTICULAR FOR A VEHICLE, AND AN AIR SUPPLY CONDUIT

TECHNICAL FIELD OF THE INVENTION

The invention lies in the field of fittings for tilting and/or removable seats, in particular for a vehicle, and more particularly the connection of such seats with an air supply conduit, in particular coming from a heating, ventilation and/or air conditioning installation. Its object is a junction device between such a supply conduit and an aeration conduit equipping the squab of such a seat.

STATE OF THE ART

It is known how to aerate a seat, in particular for a vehicle, from an air supply conduit, in particular coming from a heating, ventilation and/or air conditioning installation. The squab of the seat comprises an aeration conduit which is connected to the supply conduit by means of a junction device, using for example a conduit with bellows. Reference can in particular be made to the document FR2843916 (Valeo Climatisation), which discloses such a junction device. One problem posed lies in the junction between the supply conduit and the squab aeration conduit, when the seat is able to move, and more particularly when the seat is tilting and/or removable. This is because the conduit with bellows is liable to constitute a hindrance for the passengers of the vehicle, who may unintentionally damage it, this damage being all the more probable because the conduit with bellows is fragile. Moreover such a conduit is liable to jam during the tilting movement of the seat, which may also cause damage to it. Finally, such a conduit is visible and constitutes a visual discomfort for the passengers in the vehicle.

OBJECT OF THE INVENTION

The aim of the present invention is to propose a junction device between an air supply conduit, in particular coming from a heating, ventilation and/or air conditioning installation, and an aeration conduit included in the squab of a seat, in particular for a vehicle, which is tilting and/or removable.

A more particular aim of the present invention is to propose such a junction device which offers a facility for a simple and rapid connection of the conduits together, without this facility interfering with the methods of tilting, withdrawing or locking or unlocking in the position of use of the seat. It is also a particular aim to propose such a junction device which does not involve a specific constraining operation, both for the connection of the conduits together and possibly for the breaking of this connection. Another aim is to propose such a junction device which takes into account any break in the connection between the conduits when the seat is tilted and/or removed, in order to prevent an escape of air from the supply conduit and to prevent foreign bodies entering inside the supply conduit. Another aim is to propose such a junction device which allows a possible translation of the seat without impairing the junction of the conduits with each other. Finally, one aim is to propose such a junction device which is compact, which does not constitute a hindrance for the passengers of the vehicle and whose installation on the seat is reliable and long lasting.

The device of the present invention is a junction device between a conduit mounted on a floor for supplying air, in particular coming from a heating, ventilation and/or air conditioning installation, and an aeration conduit mounted on the squab of a seat, in particular for a vehicle. This seat is of the type of seat equipped with means of tilting about a shaft fixed to the floor between a folded-down position of use and a raised retracted position.

According to the present invention, the junction device comprises rigid members respectively allocated to the supply conduit and the aeration conduit, these rigid members being mounted so as to be able to move with respect to each other for putting the conduits in air communication with each other, at least in the folded-down position of use of the seat.

The seat tilting means advantageously constitutes means of maneuvering at least one of the rigid members.

The rigid member that can be maneuvered by the seat tilting means is in particular the one allocated to the aeration conduit.

According to a first embodiment, the means of tilting the seat advantageously constitute means of abutting the conduits against each other for their connection in the folded-down position of the seat and means of breaking this abutment in the raised position of the seat in order to break the connection of the conduits with each other, the conduits being equipped with connecting pieces constituting the said rigid members. The connection of the conduits with each other and the breaking of this connection is effected concomitantly with the maneuvering of the seat in tilting.

The choice of the designers of a connection by breakable abutment between the supply and aeration conduits will be noted, which makes it possible to connect these conduits together without requiring the presence of a specific bulky junction member between these conduits.

The outlet of the supply conduit is in particular equipped with a shutter that can be maneuvered between an open position corresponding to the folded-down position of the seat and a closed position corresponding to the erect position of the seat.

The shutter is preferentially maneuverable in the open position by a maneuvering member fixed to the seat, counter to a member for returning the shutter to the closed position.

The shutter can be maneuvered between its open and closed position either by pivoting or in translation. More particularly, this shutter is indifferently a butterfly shutter, a flag shutter, a drum shutter, a sliding shutter or any other similar movable closure member.

According to a variant embodiment, the maneuvering member cooperates with a lever mechanism connected with the shutter.

The maneuvering member consists for example of a support finger in particular coopering with the lever mechanism whilst being carried by a member locking the seat in the folded-down position.

According to another example embodiment, the support finger consists of the aeration conduit itself. According to one embodiment, the general extension axis of the conduits in their abutment zone is, with regard to that of the aeration conduit, substantially parallel to the overall plane of the squab, and with regard to that of the supply conduit, substantially parallel to the floor. These arrangements make it possible to orient the plane of the outlet of the supply conduit substantially orthogonal to the floor in order to limit the risk of introducing foreign bodies when the seat is in the erect position.

The abutment of the conduits is achieved by moving the outlet of the aeration conduit transversely to the supply conduit, following on from the tilting movement of the seat. These conduits are approximately oriented, at least in their junction zone, in the same plane substantially parallel to that of the floor when the seat is in the folded-down position.

The general extension axis of the conduits in the abutment zone is preferably substantially parallel to the tilting axis of the seat.

Preferably again, the planes of the outlets of the conduits are slightly inclined in a complementary manner with respect to the general extension axis of the conduits in their abutment zone. These provisions are aimed at preventing the shearing of a joint equipping at least either one of the outlets of the conduits when they are abutted.

The lever mechanism comprises for example a sleeve mounted so as to rotate on a linkage carried by the floor. This sleeve comprises a ramp against which the support finger bears in order to cause a rotation of the sleeve and comprises a rod maneuvering a lever carrying the pivot spindle of the shutter mounted so as to rotate on the supply conduit.

The locking member cooperating in particular with a locking linkage fixed to the floor, the said linkage constitutes the linkage on which the sleeve is mounted so as to rotate.

The supply conduit is perfectly mounted on the floor by means of the locking linkage to which it is fixed by at least one fixing flange that it has.

These fixing flanges being preferentially in a pair, these advantageously constitute axial abutment members for the sleeve for its positioning in translation along the linkage.

The sleeve preferably also comprises a member for attaching one end of the return member, the other of which is attached to a member carried by the floor.

These arrangements are such that the shutter is maneuvered in the closed position by means of the lever mechanism using the force produced by the return member.

The member carried by the floor to which the return member is attached preferably consists of the supply conduit.

According to another embodiment, the general extension axes of the conduits in their abutment area are, with regard to the aeration conduit, substantially perpendicular to the general plane of the squab and, with regard to the supply conduit, substantially perpendicular to the floor.

According to a variant embodiment, the support finger consists of the aeration conduit and the shutter is provided at the outlet from the supply conduit. The end of the supply conduit is preferably arranged as a chamber receiving the end of the aeration conduit in the folded-down position of the seat.

Where the shutter can be maneuvered in translation, the end zone of the aeration conduit intended to be received inside the chamber of the supply conduit is preferably arranged as a perforated wall, so as, using a grill structure, to allow the passage of air through it.

It is clear from the particular arrangements that have just been described that the abutment of the conduits with each other is obtained from their relative position with respect to the means of locking the seat to the floor. The junction between the conduits is easily achieved by abutment without requiring particular intervention of the user other than that of the tilting of the seat. When the seat is in the erect position, or when it is removed, the outlet of the supply conduit is spontaneously closed off by the shutter, without for all that still requiring specific intervention from the user.

According to a second embodiment, the rigid members advantageously comprise a respective vessel in air communication with each other at least in the folded-down position of use of the seat, a first vessel being allocated to the supply conduit and a second vessel being allocated to the aeration conduit, the second vessel being mounted so as to be able to move in rotation about the tilting access A1 of the seat.

The vessels are preferably coaxially fitted on one another about a seat-tilting shaft and at a radial distance from the latter to provide an air circulation passage from the first vessel to the second vessel.

The second vessel is advantageously mounted so as to be able to move in rotation about a guide wall of the first vessel. The second vessel preferentially comprises a junction element with the aeration conduit. The second vessel is in particular composed of two axial shells connected together around the guide wall of the first vessel, one of the shells comprising a radial extension constituting the junction element with the aeration conduit.

The first vessel preferentially comprises end plates in engagement on the tilting shaft for its centering at a radial distance around the latter.

The guide wall is preferably axially extended by a chamber connected to a junction conduit between the first vessel and the supply conduit. Preferably again, the junction conduit is mounted so as to slide axially with respect to the supply conduit.

The first vessel is preferentially composed of two axial shells connected together. One of the shells of the first vessel is able to form a unitary piece with the junction conduit.

DESCRIPTION OF THE FIGURES

The present invention will be better understood from a reading of the description that will be made of a preferred embodiment, in relation to the figures in the accompanying drawings, in which.

Figure 1:
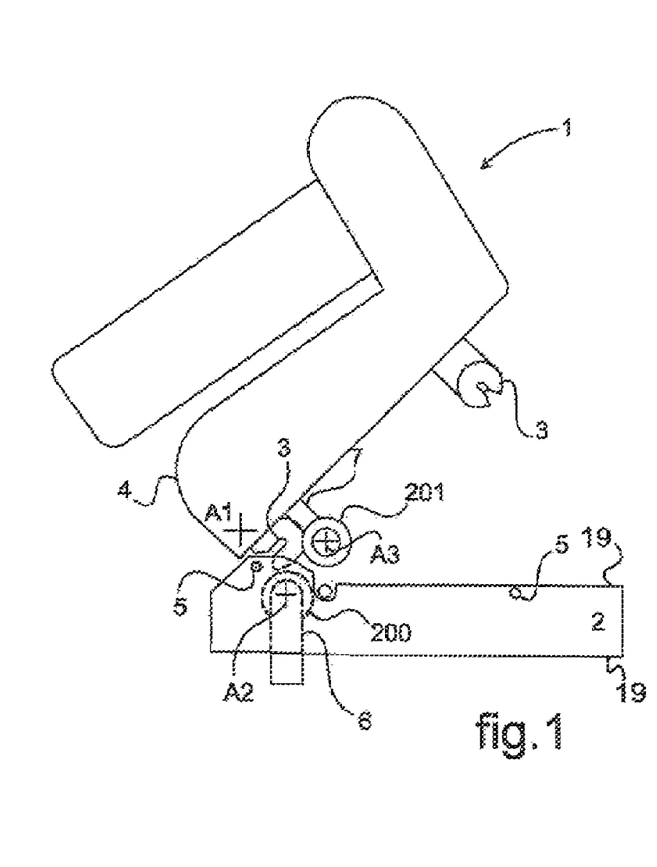
FIG. 1 and FIG. 2 are diagrams illustrating a tilting seat, respectively in the raised position and in the folded-down position.
Figure 2:
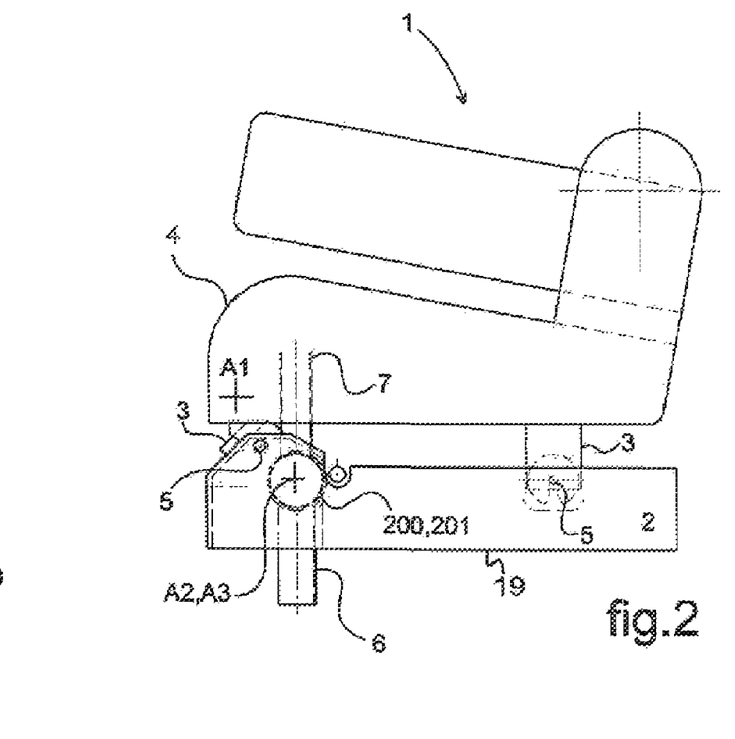

In FIG. 1 and FIG. 2, a seat (1), in particular for a vehicle, is mounted so as to be removable and able to move about a tilting axis A1, on the floor (19) of the vehicle by means of a framework (2) anchored to the chassis. This seat (1) is able to move between a raised position illustrated in FIG. 1 and a folded-down position of use illustrated in FIG. 2. Locking members (3) that the squab (4) of the seat has cooperate with linkages (5) fixed to the framework (2), for keeping the seat (1) in the folded-down position of use.

The floor (19) supports an air supply conduit (6), in particular coming from a heating, ventilation and/or air conditioning installation. This supply conduit (6) consists either of a length of conduit attached to a main conduit connected to the installation, or directly by this main conduit. As for the squab (4), this is equipped with a conduit (7) for aerating the seat. This aeration conduit (7) is fixed to the squab (4) so as to be able to move concomitantly with the maneuvering of the seat. In the raised position, the relationship between a connection piece (201) of the aeration conduit (7) and a connection piece (200) of the supply conduit (6) is broken, whilst in the folded down position these two conduits (6, 7) are exactly abutted in a sealed manner. The supply conduit (6) and the aeration conduit (7) are positioned with respect to the mobility axis A1 of the seat (1). The means of tilting the seat (1) are used to move the aeration conduit (7) between the position of abutment of the conduits (6, 7) on each other in the folded-down position of the seat (1), and a position of breaking this abutment in the raised position of the seat (1) in which the connection of the conduits (6, 7) to each other is broken.

Referring moreover to FIG. 3 to FIG. 7, the planes of the outlets of the conduits (6, 7) are oriented substantially orthogonally to the floor (19). In addition and more particularly, the general extension axis A2 and A3 of the conduits in their abutment zone are oriented parallel to the tilting access A1 of the seat. The abutment of the conduits (6, 7) is effected by means of a sliding radial approach of the outlet of the aeration conduit (7) towards that of the supply conduit (6).

In order to prevent the shearing of a seal (8) equipping at least the outlet of the supply conduit (6), the planes of the outlets of the conduits (6, 7) are slightly inclined with respect to the tilting axis A1 of the seat (1).

Figure 3:
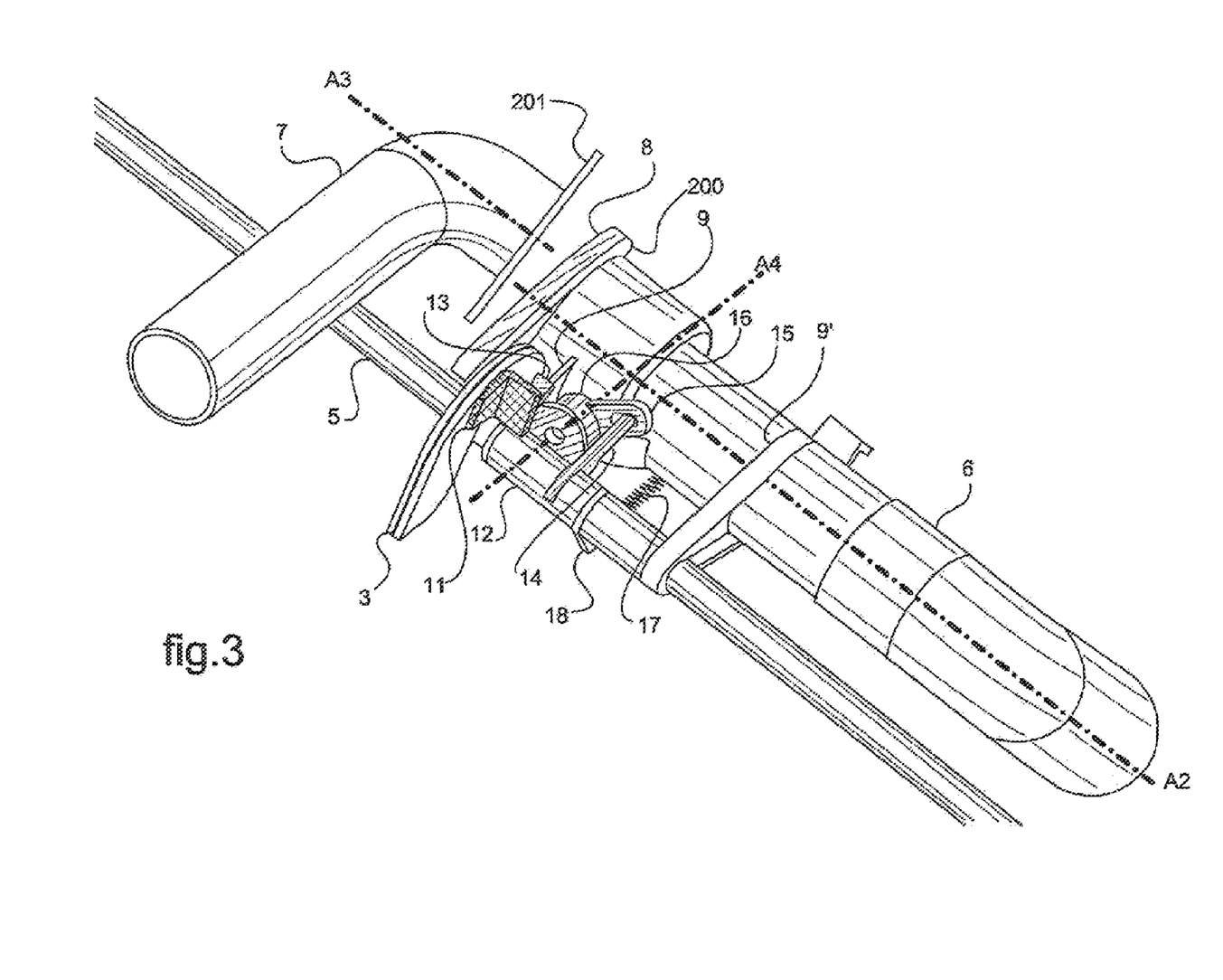
FIG. 3 and FIG. 4 are illustrations in perspective respectively in plan view and side view of a device of the present invention according to a first example embodiment, for the junction between conduits depicted in the non-abutted position.
Figure 4:
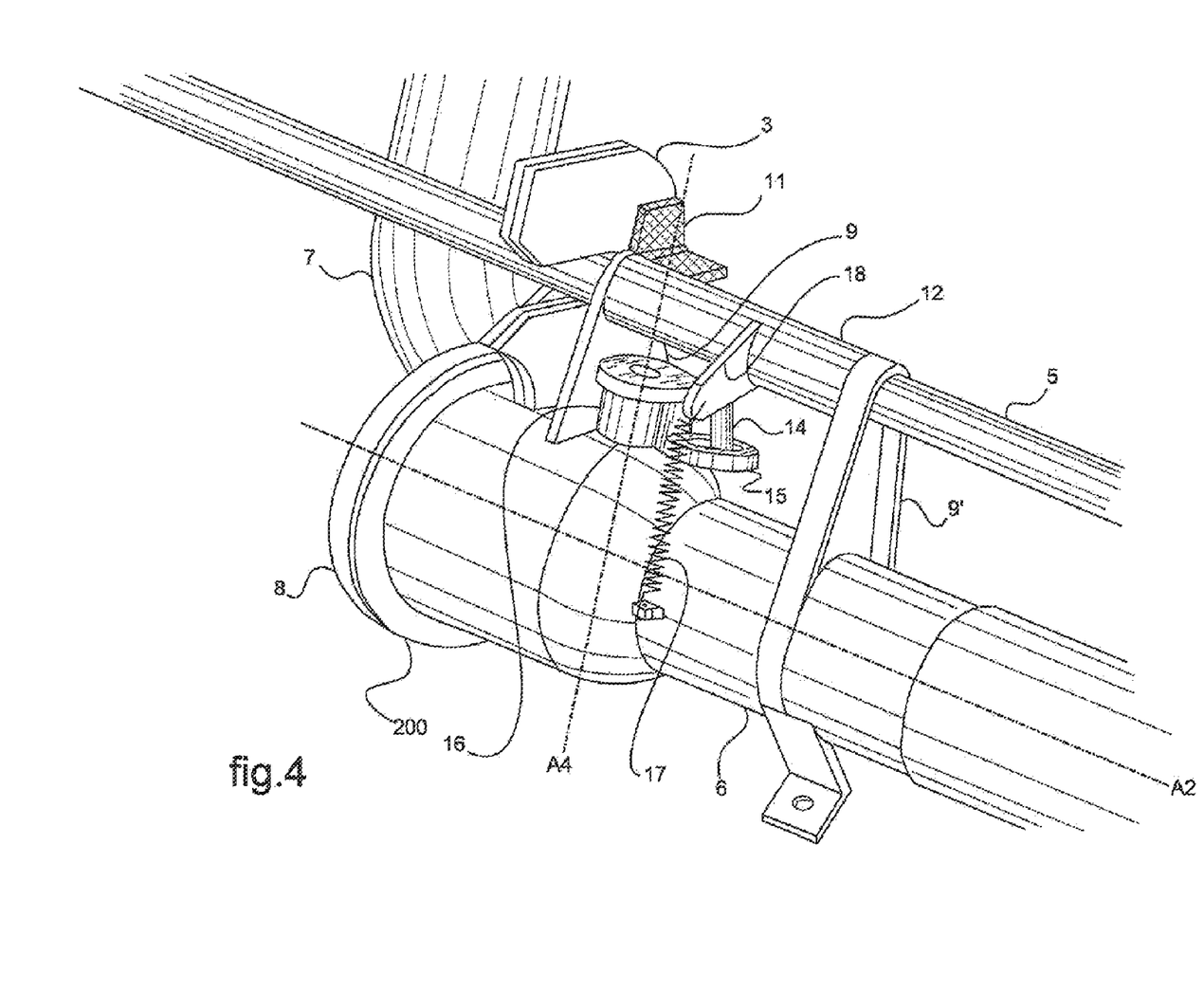
Figure 5:
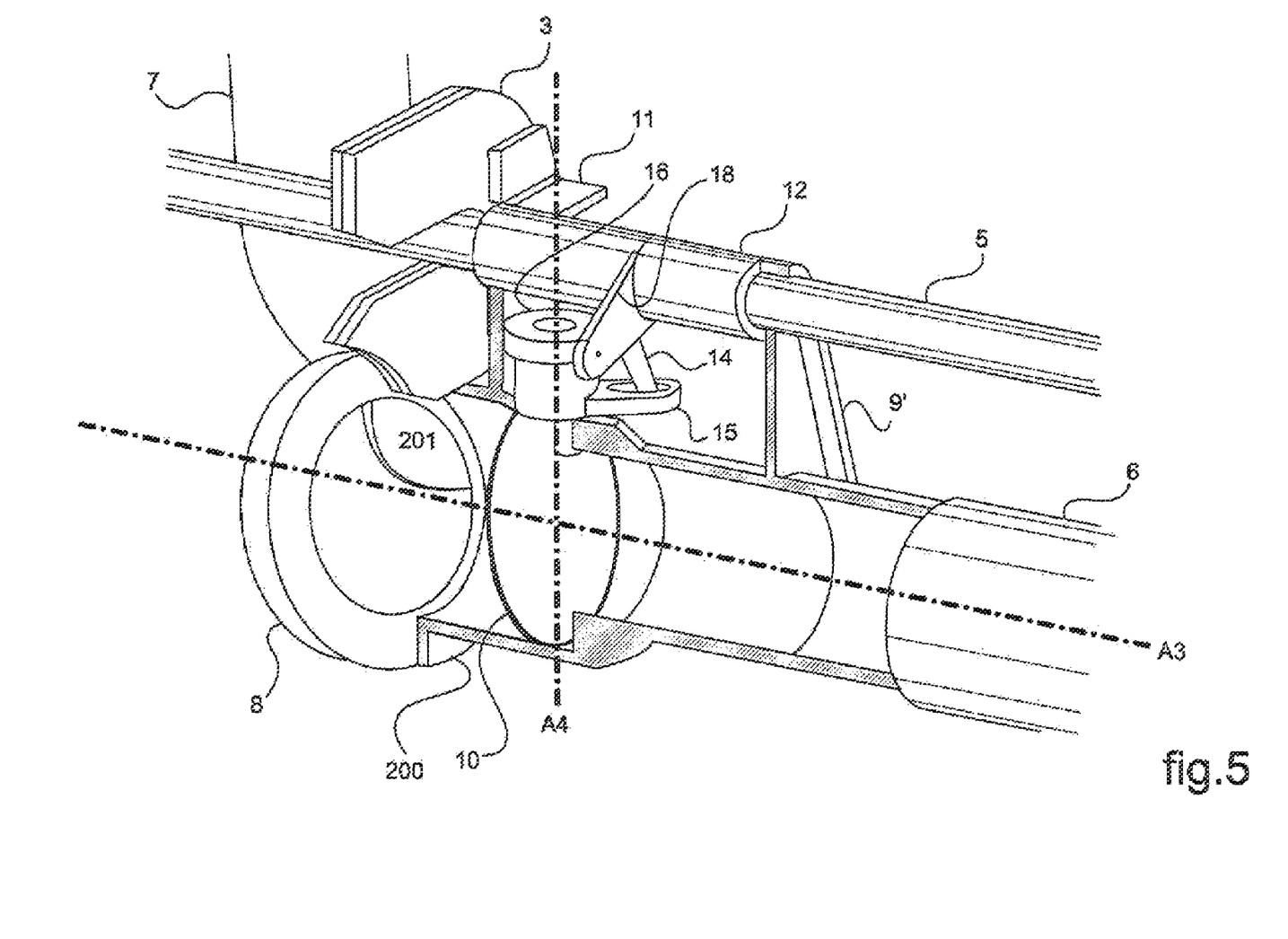
FIG. 5 is an illustration of the device as depicted in FIG. 4, in a partially cut-away view.
Figure 6:
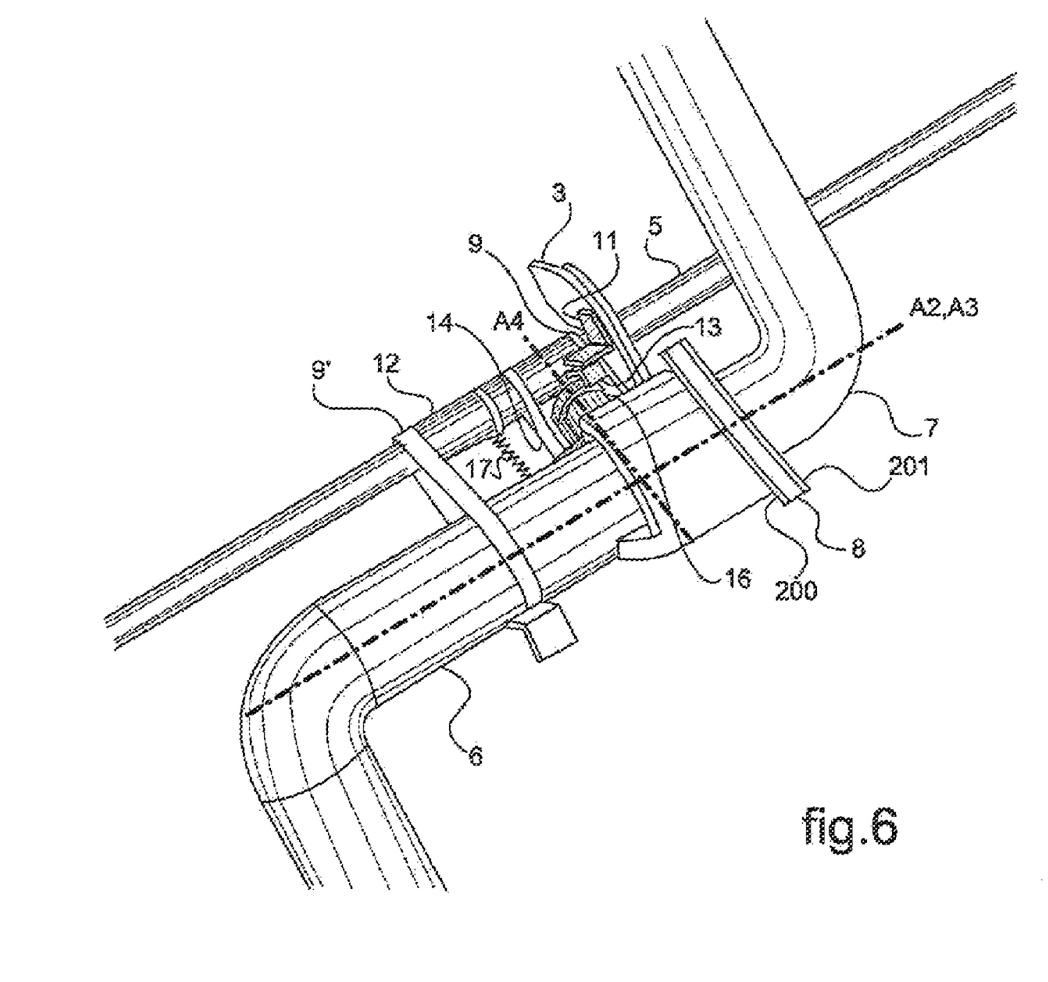
FIG. 6 is an illustration in perspective from above of the device depicted in FIG. 3 to FIG. 5, in the abutted position of the conduits.
Figure 7:
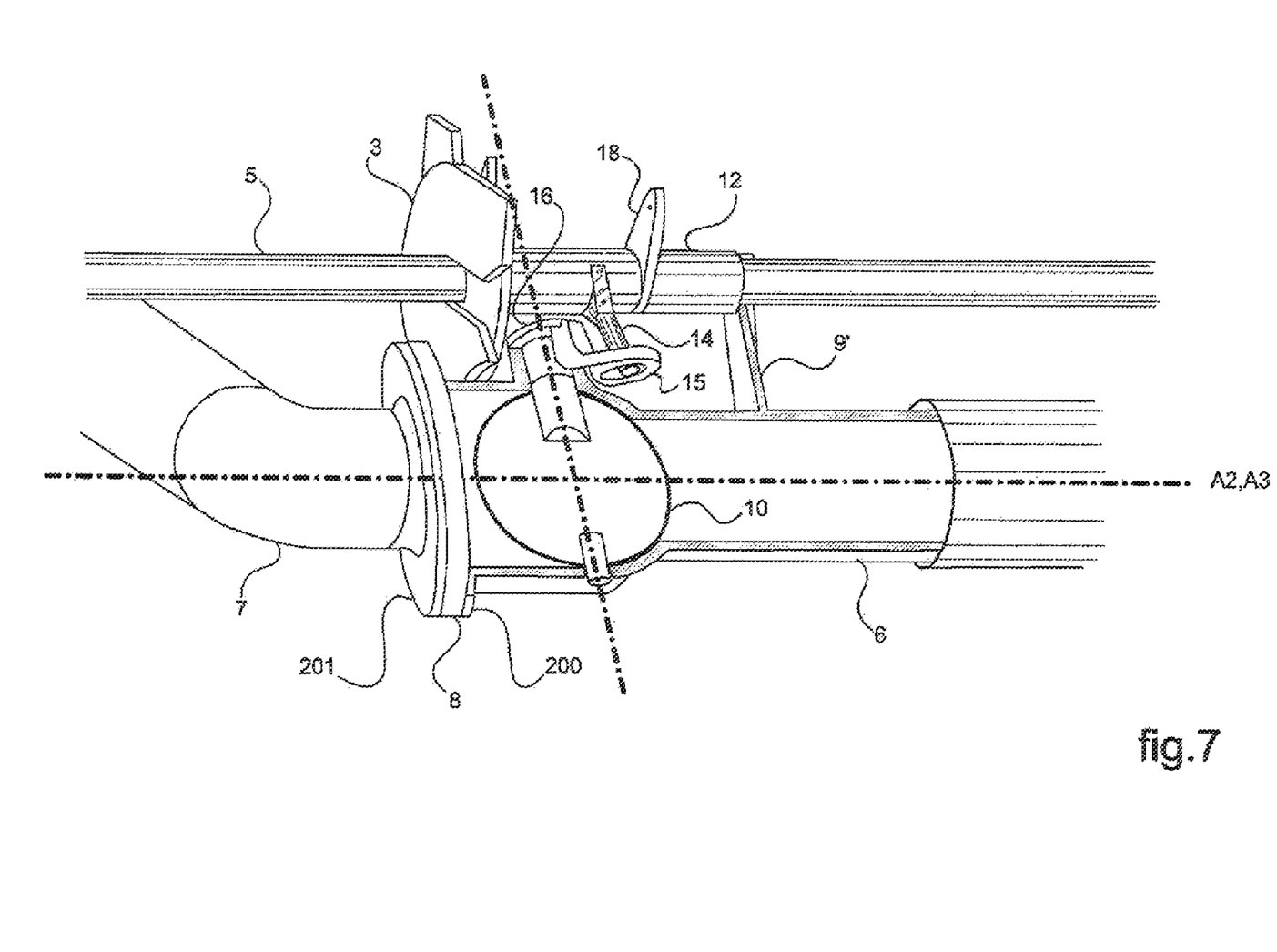
FIG. 7 is an illustration of the device as depicted in FIG. 6, in partially cut-away view.

In FIG. 3 to FIG. 7, the supply conduit (6) is fixed to the floor (19) by means of one of the locking linkages (5), and preferably the one that is closest to the tilting axis A1 of the seat (1). This fixing is in particular made by means of a pair of flanges (9, 9') connecting the supply conduit (6) to the linkage (5). The corresponding locking member (3) is used to maneuver a shutter (10) equipping the supply conduit (6). This shutter (10), visible in FIG. 5 and FIG. 7, is able to move pivotally about an axis A4 between an open position corresponding to the abutted position of the conduits (6, 7), depicted in FIG. 6 to FIG. 7, and a closed position corresponding to the position of breaking of this abutment depicted in FIG. 3 to FIG. 5. These arrangements are aimed at preventing the introduction of foreign bodies inside the supply conduit (6) when the seat (1) is in the raised position.

The locking member (3) is formed by a scalloped plate able to be maneuvered pivotally and cooperating with the linkage (5) in order to hold the seat (1) in the folded-down position, in the normal manner in this field. This locking member (3) carries a support finger (11), shaped like a square bracket for the rotational maneuvering of a sleeve (12). This sleeve (12) is mounted so as to rotate on the linkage (5) whilst being position axially along the latter by means of the fixing flanges (9, 9') of the supply conduit (6). The sleeve (12) is equipped with a ramp (13) against which the finger (11) bears in order to cause its rotation, during the pivoting of the locking member (3) about the linkage (5). The sleeve (12) carries a maneuvering rod (14) for a lever (15) carrying the articulation spindle (16) of the shutter (10). The shutter (10) is spontaneously held in the closed position by a return spring (17), one of the ends of which is fixed to the supply conduit (6) and the other end of which is attached to the sleeve (12) by means of a lever finger (18).

In the erect position of the seat, as illustrated in FIG. 3 to FIG. 5, the aeration conduit (7) is distant from the seat (1) and its connection to the supply conduit (6) is broken. The locking member (3) being away from the linkage (5), the latter exerts no thrust on the ramp (13) of the sleeve (12), which is then freely subjected to the return forces of the spring (17) in order to hold the shutter (10) in the closed position, by means of the lever mechanism associating the maneuvering rod (14) and lever (15). In the folded-down position of the seat (1), the locking member (3) is maneuvered pivotally in order to hold the seat (1) on the linkage (5). The support finger (11) then exerts a thrust on the ramp (13) in order to maneuver the sleeve (12) in rotation counter to the return forces of the spring (17). The maneuvering rod (14) then makes the lever (15) pivot, causing the opening of the shutter (10).

It is clear from these arrangements that the locking member (13) is used to maneuver the shutter (10) when it is itself maneuvered in the position of holding the seat in the folded-down position. The maneuvering of the shutter (10) is achieved both on opening and on closing by means of the sleeve (12), which is positioned axially along the linkage (5) by means of the fixing flanges (9, 9') of the supply conduit (6).

In FIG. 8 to FIG. 13, the extension axis A2 of the supply conduit (6) is oriented perpendicular to the floor (19), and the extension axis A3 of the aeration conduit (7) is oriented perpendicular to the overall plane of the squab (4). It will be understood that these orientations are to be taken into account in the abutment zone between the conduits (6, 7).

The aeration conduit (7) constitutes a support finger for maneuvering a closure shutter (20) for the supply conduit (6) in the folded-down position of the seat, this closure flap (20) being spontaneously held in the closed position when the seat is in the erect position. The end of the supply conduit (6) forms a chamber (21) receiving the corresponding end of the aeration conduit (7) in the folded-down position of the seat.

Figure 8:
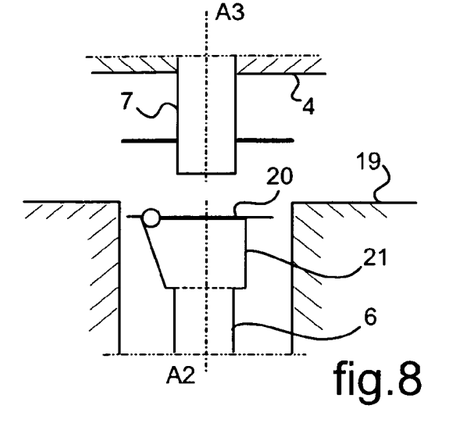
FIG. 8 and FIG. 9 are diagrams illustrating a junction device between conduits according to a second example embodiment of the invention, respectively in the non-abutted position and in the abutted position.
Figure 9:
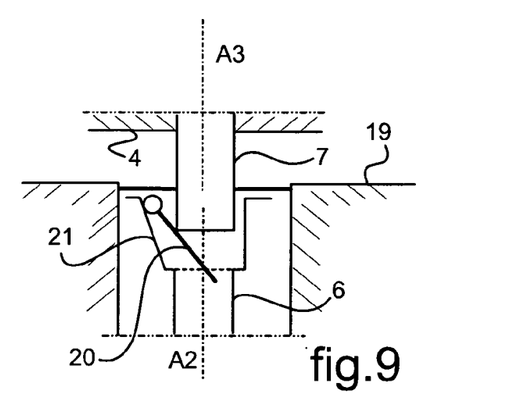

In FIG. 8 and FIG. 9, the shutter (20) is mounted so as to tilt at the end of the supply conduit (6).

Figure 10:
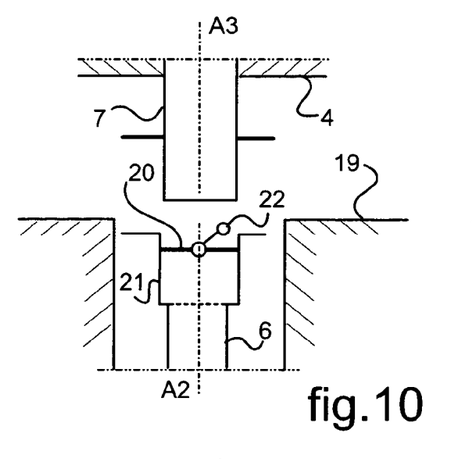
FIG. 10 and FIG. 11 are diagrams illustrating a junction device between conduits according to a third example embodiment, respectively in the non-abutted position and in the abutted position.
Figure 11:
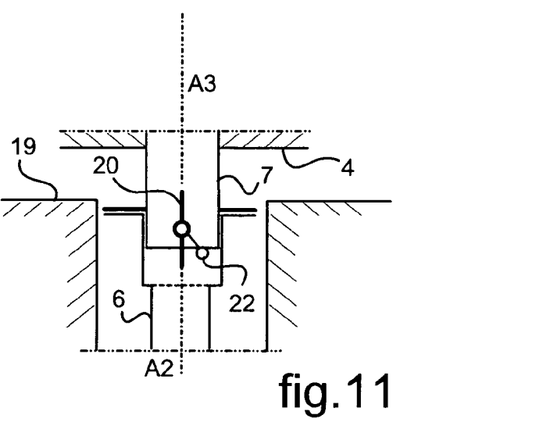

In FIG. 10 and FIG. 11, the shutter (20) is a butterfly shutter mounted so as to pivot at the end of the supply conduit (6). The aeration conduit (7) constitutes a support finger against a lever mechanism (22) for maneuvering the shutter (20).

Figure 12:
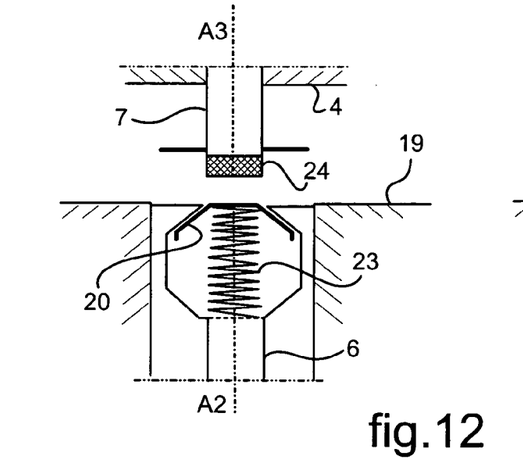
FIG. 12 and FIG. 13 are diagrams illustrating a junction device between conduits according to a fourth example embodiment, respectively in the non-abutted position and in the abutted position.
Figure 13:
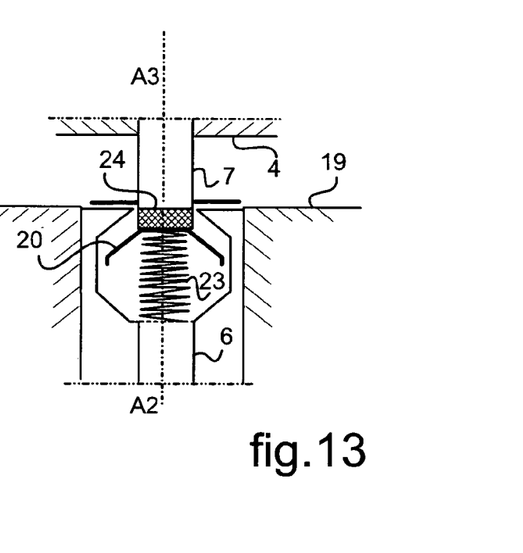

In FIG. 12 and FIG. 13, the shutter (20) is able to move in translation counter to a thrust exerted by a return spring (23). The end of the aeration conduit (7) is arranged in a perforated wall (24) for the passage of the air through it in the folded-down position of the seat.

Figure 14:
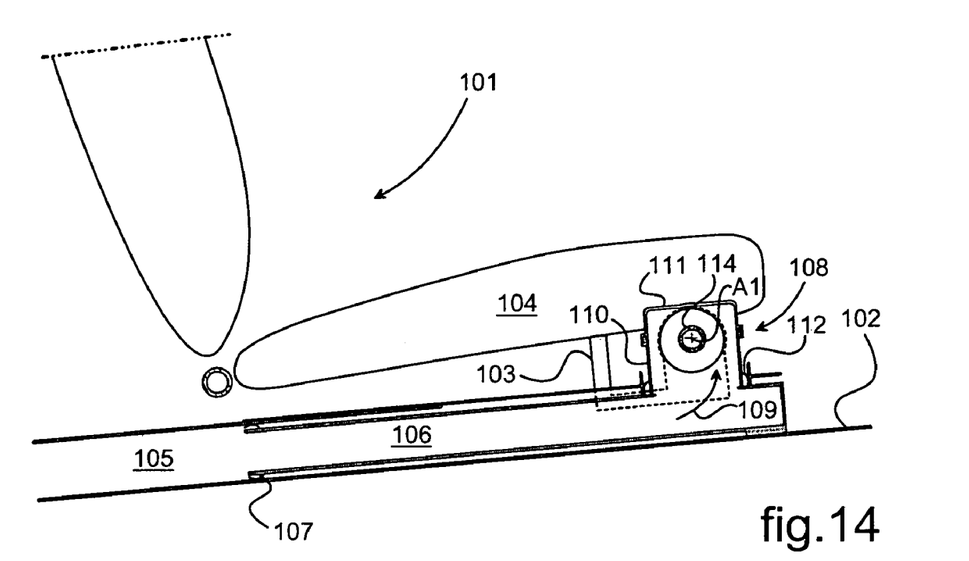
FIG. 14 and FIG. 15 are schematic illustrations in side view of a seat equipped with a junction device according to a fifth example embodiment of the invention seen respectively in the folded down position of use and in the raised retracted position of the seat.
Figure 15:
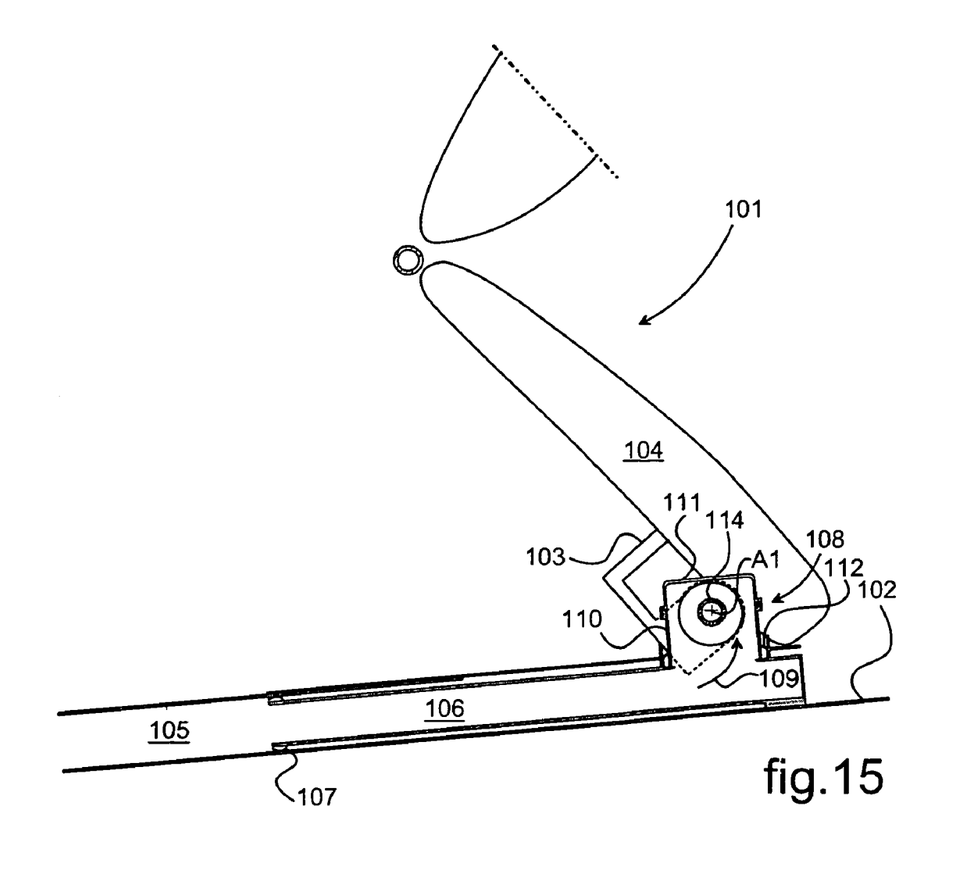

In FIG. 14 and FIG. 15, a seat (101), in particular for a vehicle, is mounted so as to move in rotation about a tilting axis A1 between a folded-down position of use illustrated in FIG. 14 and a raised retracted position illustrated in FIG. 15. The seat (101) is also mounted so as to move in translation on guide rails, not shown in the figures, fixed to the floor (102) of the vehicle. The seat is provided with an aeration conduit (103) for ventilating in particular its squab (104). For this purpose, a junction device is interposed between an air supply conduit (105), connected to a ventilation, heating and/or air conditioning installation of the vehicle, and the aeration conduit (103) of the seat (101). This junction device is organized so as to allow air communication between the supply conduit (105) and the aeration conduit (103), whatever the position of the seat (101), and in particular in the folded-down position of the latter (101).

The junction device comprises a junction conduit (106) mounted so as to slide axially inside the supply conduit (105). These arrangements are such that the air communication between the supply conduit (105) and the junction device is maintained, including during a translation movement of the seat (101). A peripheral seal (107), or the like, is interposed between the supply conduit (105) and the junction conduit (106) in order to avoid leakages of air.

The junction device also comprises a first vessel (108) fixed to the junction conduit (106). The first vessel (108) is in air communication with the junction conduit (106) by means of an air passage (109), this communication being maintained whatever the position of the seat (101).

The first vessel (108) consists of two axial shells (110, 111) disposed on each side of the tilting axis A1 of the seat (101). These shells, (110, 111) are connected together by fitting together, welding, screwing or the like, a bottom shell (110) being interposed between the junction conduit (106) and a top shell (111). These shells (110, 111) are preferentially produced from a plastics material, polypropylene for example, shaped by molding, injection or the like. The bottom shell (110) is preferentially provided with sealing lips (112) for preventing air losses between the bottom shell (110) and the junction conduit (106). According to an embodiment that is not shown, the bottom shell and the junction conduit form a unitary piece. According to another embodiment, not shown, the bottom shell consists of two elementary shells sliding with respect to each other to allow easy adjustment of the position of the junction device according to the distance separating the tilting axis A1 of the seat (101) and the supply conduit (105). Such a design of the bottom shell makes it possible to correct, along an axis orthogonal to the floor, any variations in tolerance and/or dimension presented by the elements making up the junction device and/or the seat.

Figure 16:
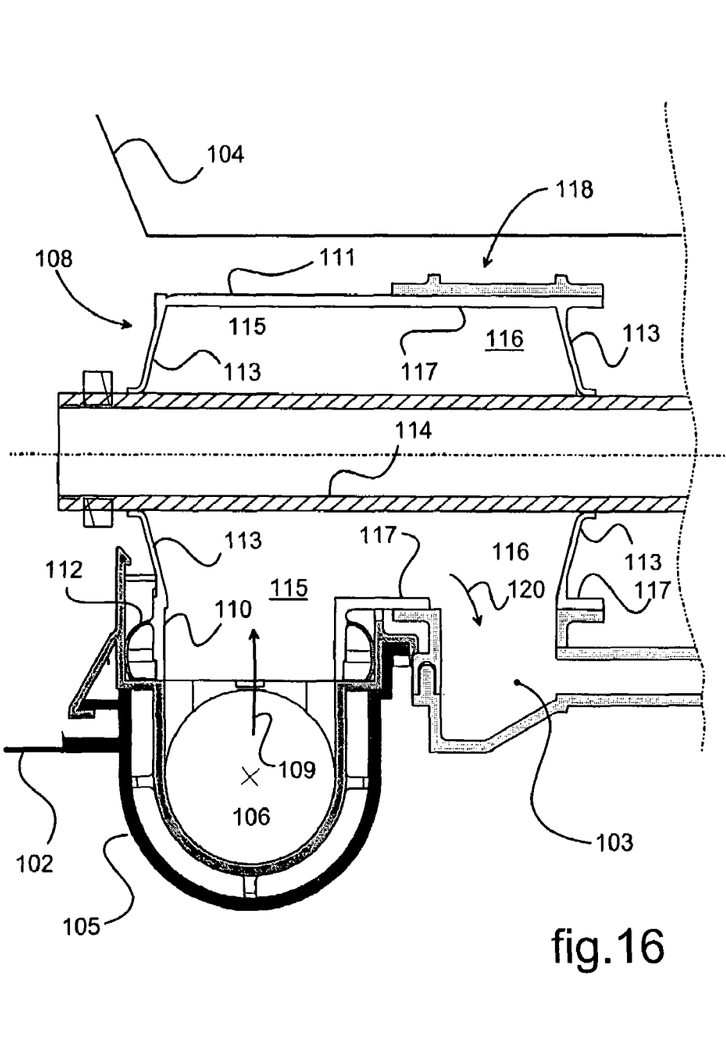
FIG. 16 is a partial illustration of the junction device depicted in FIG. 14 and FIG. 15, in front axial section along the tilting axis of the seat.
Figure 17:
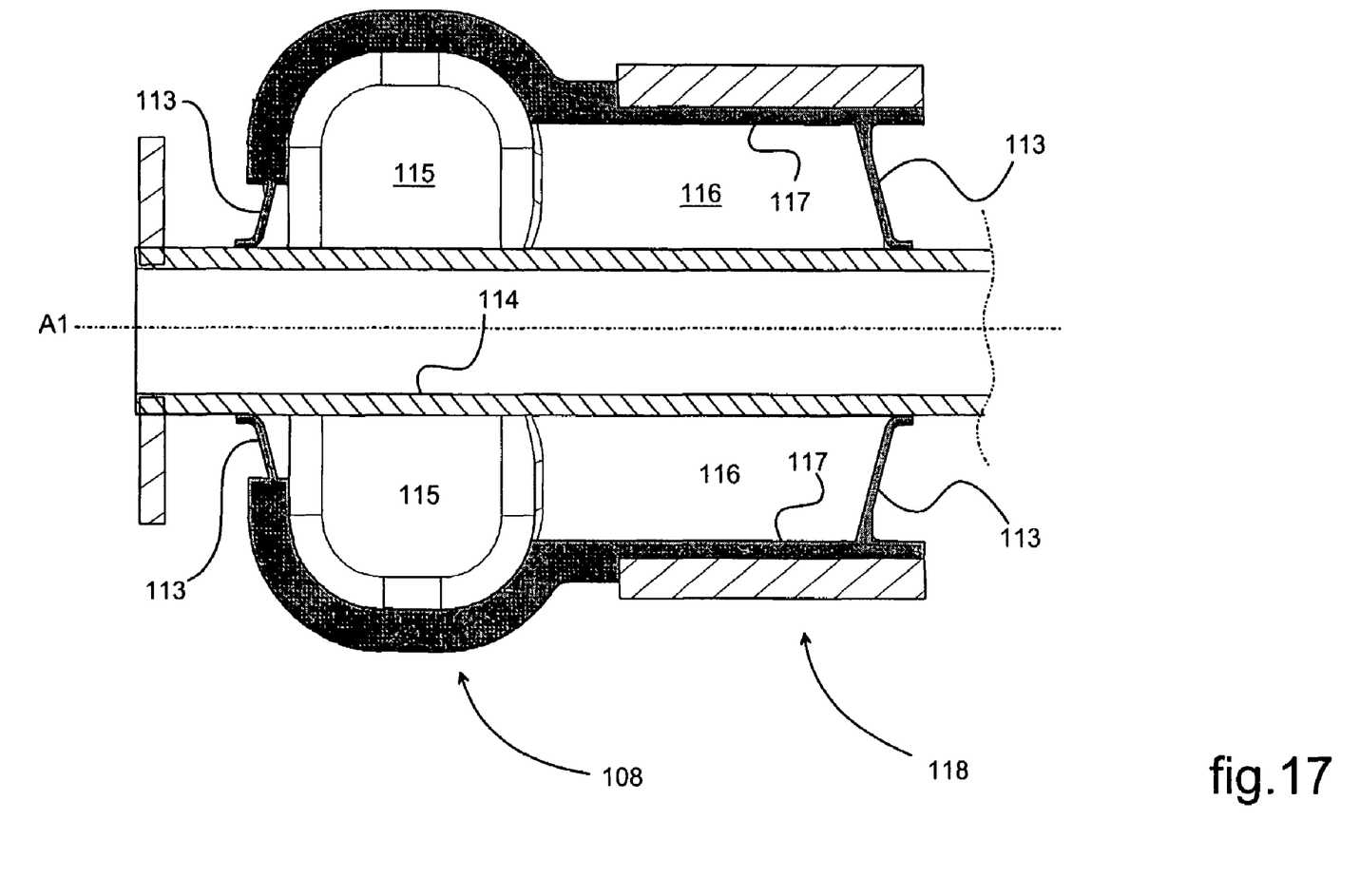
FIG. 17 is a partial illustration of the junction device depicted in FIG. 14 to FIG. 16, in transverse axial section along the tilting axis of the seat.

In FIG. 16 and FIG. 17, the first vessel (108) comprises end plates (113) that are radially engaged on a tilting shaft (114) of the seat (101) with a view to its centering on the latter (114). The first vessel (108) delimits a chamber (115) which overhangs the air passage (119). This chamber (115) is able to have any geometry relatively speaking, roughly parallelepipedal in the example embodiment illustrated. The chamber (115) is extended axially by an enclosure (116), which is delimited by a cylindrical zone (117) of the wall of the first vessel (108). This cylindrical zone (117) constitutes a guide wall of a second vessel (118), which is mounted so as to move in rotation by axial fitting on the first vessel (108).

The second vessel (118) comprises a radial extension (119) forming a junction element between the second vessel (118) and the aeration conduit (103). The guide wall (117) of the first vessel (108) enveloped by the second vessel (118) is provided with an opening (120) provided at its periphery, which opens out on the junction element (119), to allow the passage of air from the first vessel (108) to the aeration conduit (103). In the folded-down position of use of the seat (101), as illustrated in FIG. 16, the opening that the first vessel (108) has is totally left clear in order to assist the circulation of air towards the aeration conduit (103).

The result of these arrangements is that such a junction device has long life and satisfactory reliability, from the use of winged members consisting of elements assembled by fitting together, welding or the like. Such a junction device dispenses with the use of potentially fragile deformable elements and also has the advantage of being compact, in particular from a close-together arrangement of the elements making it up, not only axially but also radially around the tilting shaft (114) of the seat (101).

Figure 18:
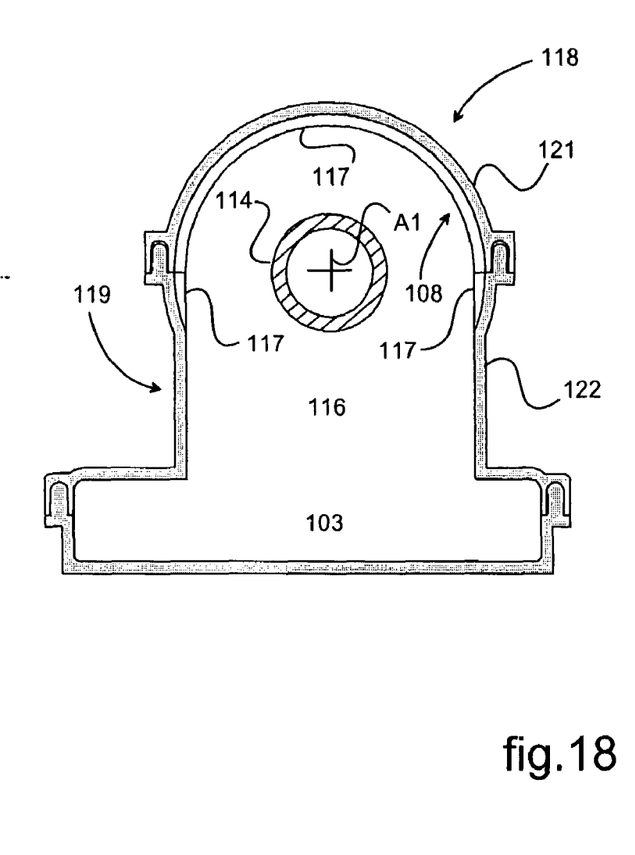
FIG. 18 is an illustration of a transverse section of the junction device illustrated in FIG. 14 to FIG. 17.

In FIG. 18, the opening (120) that the first vessel (108) has extends widely, to allow where necessary a passage of air from the first vessel (108) towards the aeration conduit (103), including in the raised retracted position of the seat (101) in order where necessary to maintain ventilation of the seat (101), whatever its position.

The second vessel (118) is composed of two semicylindrical axial shells (121, 122) fitted one on the other, one (122) of the shells (121, 122) comprising the junction element (119). The shells (121, 122) are preferentially produced from a plastics material, polypropylene for example, formed by molding, injection or the like.

What is claimed is:

1. A junction device between a supply conduit mounted on a floor for supplying air and an aeration conduit mounted on a squab of a seat of a vehicle and disposed at least partially within the squab of the seat, this seat being equipped with means of tilting about an axis (A1) fixed to the floor between a folded-down position of use and a raised retracted position, said device comprising rigid members of the supply conduit and the aeration conduit, these rigid members being mounted so as to be able to move with respect to each other for putting the conduits in air communication with each other, at least in the folded-down position of use, and wherein the means of tilting the seat constitute means of abutting the conduits together to connect them in the folded-down position of the seat and means of breaking this abutment in the raised position of the seat in order to break the connection of the conduits to each other, the conduits being equipped with connecting pieces constituting the said rigid members.

2. A junction device as claimed in claim 1, wherein the means of tilting the seat constitutes means of maneuvering at least one of the rigid members.

3. A junction device as claimed in claim 1, wherein the rigid member of the aeration conduit is able to be maneuvered by means of tilting the seat.

4. A junction device as claimed in claim 1, wherein the supply conduit defines an outlet and the outlet is equipped with a shutter able to be maneuvered between an open position corresponding to the folded-down position of the seat and a closed position corresponding to the erect position of the seat.

5. A junction device as claimed in claim 4, wherein the shutter can be maneuvered in an open position by a maneuvering member fixed to the seat, counter to a return member of the shutter in the closed position.

6. A junction device as claimed in claim 5, wherein the shutter can be maneuvered by pivoting between its open and closed positions.

7. A junction device as claimed in claim 5, wherein the maneuvering member cooperates with a lever mechanism connected with the shutter.

8. A junction device as claimed in claim 5, wherein the maneuvering member includes a support finger.

9. A junction device as claimed in claim 8, wherein the support finger is carried by a member for locking the seat in the folded-down position.

10. A junction device as claimed in claim 1, wherein each conduit defining an outlet, each outlet defining a plane, the outlets of the conduits abut in an abutment zone, a longitudinal axis is defined by each conduit in the abutment zone, and wherein the planes of the outlets of the conduits are slightly inclined in a complementary manner with respect to the longitudinal axes of the conduits in their abutment zone.

11. A junction device as claimed in claim 7, wherein the lever mechanism comprises a sleeve mounted so as to rotate on a linkage carried by the floor, this sleeve comprising a ramp against which the support finger bears in order to cause a rotation of the sleeve, and comprising a rod maneuvering a lever carrying the pivot spindle of the shutter mounted on the supply conduit.

12. A junction device as claimed in claim 11, wherein, the locking member cooperating with a locking linkage fixed to the floor, said locking linkage constitutes the aforementioned linkage on which the sleeve is rotatably mounted.

13. A junction device as claimed in claim 12, wherein the supply conduit is mounted on the floor by means of the locking linkage, to which it is fixed by at least one fixing flange that it comprises.

14. A junction device as claimed in claim 13, wherein, the fixing flanges being in pairs, these also constitute axial stop members for the sleeve for its positioning in translation along the linkage.

15. A junction device as claimed in claim 11, wherein the sleeve also comprises a member for attaching one end of the return member, the other end of which is attached to a member carried by the floor, so that the maneuvering of the flap in the closed position is effected by means of the lever mechanism from the force produced by the return member.

16. A junction device between a supply conduit mounted on a floor for supplying air and an aeration conduit mounted on a squab of a seat of a vehicle, this seat being equipped with means of tilting about an axis (A1) fixed to the floor between a folded-down position of use and a raised retracted position, said device comprising rigid members of the supply conduit and the aeration conduit, these rigid members being mounted so as to be able to move with respect to each other for putting the conduits in air communication with each other, at least in the folded-down position of use the seat, and wherein the conduits comprise general extension axes and define an abutment zone in which the conduits abut one another and each conduit defines a longitudinal axis and wherein the longitudinal axis of the aeration conduit in the abutment zone is substantially parallel to a general plane of the squab and the longitudinal axis of the supply conduit in the abutment zone is substantially parallel to the floor.

17. A junction device as claimed in claim 16, wherein the longitudinal axes of the conduits in the abutment zone are substantially parallel to the tilting axis of the seat.

18. A junction device between a supply conduit mounted on a floor for supplying air and an aeration conduit mounted on the squab of a seat of a vehicle, this seat being equipped with means of tilting about an axis (A1) fixed to the floor between a folded-down position of use and a raised retracted position, said device comprising rigid members of the supply conduit and the aeration conduit, these rigid members being mounted so as to be able to move with respect to each other for putting the conduits in air communication with each other, at least in the folded-down position of use;

wherein the means of tilting the seat constitute means of abutting the conduits together in an abutment zone to connect them in the folded-down position of the seat and means of breaking this abutment in the raised position of the seat in order to break the connection of the conduits to each other, the conduits being equipped with connecting pieces constituting the said rigid members;

wherein each of the conduits define an outlet and each of the outlets define a plane; and wherein the planes of the outlets of the conduits are slightly inclined in a complementary manner with respect to a longitudinal axis of the conduits in the abutment zone.

* * * * *